United States Patent [19]

Kennedy, III et al.

[11] Patent Number: 6,018,657
[45] Date of Patent: Jan. 25, 2000

[54] SYSTEM AND METHOD FOR COMMUNICATING A MESSAGE USING A CELLULAR TELEPHONE NETWORK

[75] Inventors: William C. Kennedy, III; William C. Kennedy, Jr.; William C. Saunders, all of Dallas, Tex.

[73] Assignee: HighwayMaster Communications, Inc., Dallas, Tex.

[21] Appl. No.: 08/841,834

[22] Filed: May 5, 1997

[51] Int. Cl.$^7$ ........................................................ H01S 4/00
[52] U.S. Cl. ............................ 455/426; 455/422; 455/517
[58] Field of Search ................................... 455/422, 507, 455/517, 556, 557, 560, 426

[56] References Cited

U.S. PATENT DOCUMENTS

| | | | |
|---|---|---|---|
| H610 | 3/1989 | Focarile et al. | 379/60 |
| 4,775,999 | 10/1988 | Williams | 379/59 |
| 4,856,047 | 8/1989 | Saunders | 379/57 |
| 5,153,902 | 10/1992 | Buhl et al. | 379/57 |
| 5,153,903 | 10/1992 | Eastmond et al. | 379/57 |
| 5,247,700 | 9/1993 | Wohl et al. | 455/33.1 |
| 5,278,890 | 1/1994 | Beeson, Jr. et al. | 379/57 |
| 5,305,466 | 4/1994 | Taketsugu | 455/33.1 |
| 5,369,681 | 11/1994 | Boudreu et al. | 379/87 |
| 5,418,528 | 5/1995 | Hosack et al. | 340/825.44 |
| 5,423,056 | 6/1995 | Linquist et al. | 455/33.1 |
| 5,463,672 | 10/1995 | Kage | 379/59 |
| 5,506,886 | 4/1996 | Maine et al. | 379/57 |
| 5,513,183 | 4/1996 | Kay et al. | 370/95.3 |
| 5,513,243 | 4/1996 | Kage | 379/58 |
| 5,517,690 | 5/1996 | Linquist et al. | 455/33.1 |
| 5,519,621 | 5/1996 | Wortham | 364/460 |
| 5,526,398 | 6/1996 | Okada et al. | 379/57 |
| 5,533,094 | 7/1996 | Sanmugam | 379/57 |
| 5,546,444 | 8/1996 | Roach, Jr. et al. | 379/59 |
| 5,590,133 | 12/1996 | Billström et al. | 370/349 |
| 5,781,612 | 7/1998 | Choi et al. | 379/58 |
| 5,794,144 | 8/1998 | Comer et al. | 455/426 |
| 5,802,465 | 9/1998 | Hamalaine et al. | 455/403 |
| 5,802,470 | 9/1998 | Gaulke et al. | 455/426 |

FOREIGN PATENT DOCUMENTS

0484918 A2  5/1992  European Pat. Off. .......... H04B 7/26

OTHER PUBLICATIONS

PCT Search Report in International Application No. PCT/US 98/07472, 6 pages, Nov. 5, 1998.

"EIA/TIA Interim Standard—Cellular Radiotelecommunications Intersystem Operations: Functional Overview," EIA/TIA/IS–41.1–B, Electronic Industries Association Engineering Department, Jan. 1992, 14 pages and table of contents.

"EIA/TIA Interim Standard—Cellular Radiotelecommunications Intersystem Operations: Intersystem Handoff," EIA/TIA/IS–41.2–B, Electronic Industries Association Engineering Department, Jan., 1992, 25 pages and table of contents.

"EIA/TIA Interim Standard—Cellular Radiotelecommunications Intersystem Operations: Automatic Roaming," EIA/TIA/IS–41.3–B, Electronic Industries Association Engineering Department, Jan., 1992, 58 pages and table of contents.

"EIA/TIA Interim Standard—Cellular Radiotelecommunications Intersystem Operations: Operations, Administration, and Maintenance," EIA/TIA/IS–41.4–B, Electronic Industries Association Engineering Department, Jan., 1992, 29 pages and table of contents.

"EIA/TIA Interim Standard—Cellular Radiotelecommunications Intersystem Operations: Data Communications," EIA/TIA/IS–41.5–B, Electronics Industries Association Engineering Department, Jan., 1992, 84 pages and table of contents.

(List continued on next page.)

*Primary Examiner*—Edward F. Urban
*Assistant Examiner*—Sheila B Smith
*Attorney, Agent, or Firm*—Baker & Botts, L.L.P.

[57] ABSTRACT

A communication system includes a cellular telephone network that provides communication services to messaging units. A network central controller (NCC) or gateway MSC couple the cellular telephone network to external devices. The communication system allows messaging between messaging units and between messaging units and external devices.

64 Claims, 6 Drawing Sheets

OTHER PUBLICATIONS

"EIA/TIA Standard—Mobile Station—Land Station Compatibility Specification," EIA/TIA–533, Electronic Industries Association Engineering Department, Sep. 1989, 73 pages and table of contents.

"ETSI TC–SMG—Digital Cellular Telecommunications System (Phase 2); Technical Realization of Short Message Service Cell Broadcast (SMSCB) (GSM 03.41)," ETS 300 537, European Telecommunications Standards Institute, May 1996, 23 pages and including table of contents.

"ETSI TC–SMG—Digital Cellular Telecommunications System (Phase 2); Technical Realization of the Short Message Service (SMS) Point–to–Point (PP) (GSM 03.40)," ETS 300 536, European Telecommunictions Standards Institute, Oct. 1996, 106 pages and including table of contents.

"EIA/TIA Interim Standard—Cellular Radio–Telecommunications Intersystem Operations: Automatic Roaming," EIA/TIA/IS–41.3–B, Electronic Industries Association Engineering Department, Dec., 1991, 64 pages and table of contents.

SYSTEM AND METHOD FOR COMMUNICATING A MESSAGE USING A CELLULAR TELEPHONE NETWORK

TECHNICAL FIELD OF THE INVENTION

This invention relates to the field of communications, and more particularly to a system and method for communicating a message using a cellular telephone network.

BACKGROUND OF THE INVENTION

A mobile voice communication system, such as a cellular telephone system, provides communication services to a subscriber. A typical cellular telephone system includes a collection of interconnected cell sites and mobile switching centers that perform call setup, processing, and hand-off techniques to provide uninterrupted voice service to the subscriber. A modicum of cooperation among cellular telephone systems provide a roaming capability where subscribers may receive voice services in a variety of cellular telephone systems that collectively form a cellular telephone network.

As a result, the cellular telephone network provides voice services to customers over a broad geographic area. Unfortunately, the cellular telephone network design and infrastructure primarily supports voice services, with little or no capabilities to communicate message data. Most of the data handled by the cellular telephone network relates to the operation of the cellular telephone network, such as information to provide cellular registrations, call processing, and hand-off procedures.

A few techniques attempt to provide data messaging in a cellular telephone network, but suffer from an overly complicated implementation or modification of cellular telephone infrastructure. Other techniques primarily support one-way communications, while still other techniques suffer from limited capacity or reduced geographic coverage.

SUMMARY OF THE INVENTION

In accordance with the present invention, a communication system and method are provided that substantially eliminate or reduce disadvantages or problems associated with previously developed communication systems and methods. In particular, the present invention provides a system and method for communicating a message using a cellular telephone network.

In one embodiment of the present invention, a system for communicating a message to a messaging unit using a cellular telephone network includes a messaging unit. A serving mobile switching center is a portion of the cellular telephone network and provides service to the messaging unit. A network central controller is coupled to the serving mobile switching center and includes a first database that identifies the serving mobile switching center that provides service to the messaging unit. A device external to the cellular telephone network is coupled to the network central controller by a communication network. The device generates a message for delivery to the messaging unit using the network central controller and the serving mobile switching center of the cellular telephone network.

In another embodiment of the present invention, a system for communicating messages containing user data between messaging units using a cellular telephone network includes a first messaging unit and a second messaging unit. Mobile switching centers of the cellular telephone network have a first mode to generate a remote message for delivery to another mobile switching center and a second mode to generate a local message for delivery to the second messaging unit. The remote message and the local message contain user data for delivery from the first messaging unit to the second messaging unit.

In yet another embodiment of the present invention, a method for processing a message received at a mobile switching center of a cellular telephone network includes: receiving a message at a mobile switching center, the message having an originating address, destination address, and message data; generating a remote message that addresses another mobile switching center if the mobile switching center does not serve the destination address; and generating a local message that addresses the destination address if the mobile switching center serves the destination address.

Technical advantages of the present invention include an extension of the capabilities of a cellular telephone network to include flexible and reliable bidirectional message delivery in a cellular telephone network without a significant modification of equipment or processing techniques. In one embodiment, an originating messaging unit communicates the message to a destination messaging unit, where both the origination and destination messaging units receive communication service from the cellular telephone network. In another embodiment, the message originates from or terminates into a device external to the cellular telephone network, such as a paging terminal, computer, telephone, or other communication device coupled to the cellular telephone network using the public switched telephone network or a global computer network such as the Internet. Messages communicated among messaging units and external devices may include user data that is not associated with the operation of the cellular telephone network.

Another important technical advantage of the present invention is the use of the cellular telephone infrastructure to support a variety of messaging capabilities between messaging units and other external devices. For example, the present invention may utilize an analog cellular telephone network and its associated mobile switching centers, cell sites, and software to provide extended messaging capabilities. One technique uses the extended protocol message in both the forward and reverse control channels to communicate messages to and from the messaging units. The present invention also incorporates other data messaging techniques, such as mobile identification number (MIN) statusing and feature code request messaging.

Still another technical advantage of the present invention is the provisioning of messaging services over a wide coverage area supported by a network of cellular telephone systems. In a particular embodiment, the present invention includes a network central controller (NCC) that facilitates communications among messaging units serviced by the cellular telephone network and external devices that are not part of the cellular telephone network. The NCC maintains registration, identification, and location information for messaging units and external devices. The NCC also manages and controls the messaging functions through a store and forward operation.

Still another technical advantage of the present invention includes a common processing technique employed by mobile switching centers to support the transmission of messages through the cellular telephone network. This technique employs both local messages for delivery between mobile switching centers and messaging units, as well as remote messages for delivery between mobile switching centers. This processing and addressing technique may be extended to include messaging with devices external to the cellular telephone network. Other technical advantages are readily apparent from one skilled in the art from the following figures, descriptions, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
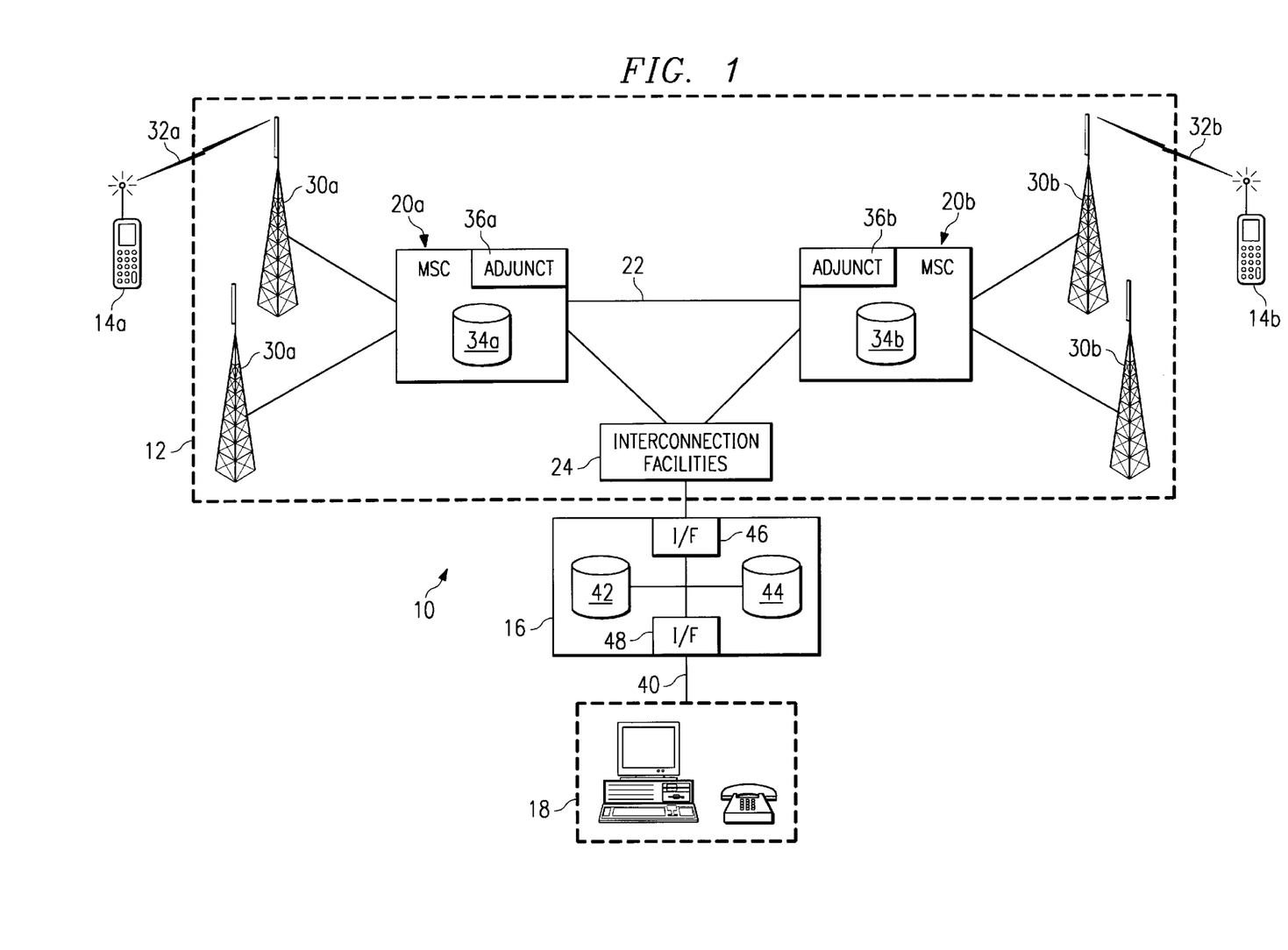
FIG. 1 illustrates a communication system that includes a cellular telephone network with access to external devices.

FIG. 1 illustrates a communication system 10 that includes components of a cellular telephone network 12, messaging units 14, a network central controller (NCC) 16, and a variety of external devices 18. Generally, communication system 10 provides messaging service between messaging units 14 or between messaging units 14 and external devices 18. For purposes of description, components of communication system 10 may be referred to generally with a reference numeral (e.g., MSC 20, messaging unit 14) or specifically with a combined reference number and letter (e.g., MSC 20a, messaging unit 14a).

Components of cellular telephone network 12 provide communication service to messaging units 14. Generally, messaging units 14 may be a cellular telephone that supports voice service, a pager unit that supports data service, a hybrid device that supports both voice and data service, or another device or component that can communicate information with cellular telephone network 12. Messaging units 14 may support inbound messaging (receivers), outbound messaging (transmitters), or both inbound and outbound messaging (transceivers). Also, messaging units 14 may be fixed or mobile depending on the particular application. For example, vehicles, persons, or other mobile items may be equipped with messaging units 14 to provide data service or voice and data service at the mobile item. Alternatively, fixed data collection or processing sites may include a messaging unit 14 that can both receive and send information related to the activities at the fixed site. One particular embodiment places messaging units 14 at utility sensors, vending machines, remote actuation devices, or any other device that receives information from or communicates information to a remote site.

Components of cellular telephone network 12 also provide communication service to external devices 18. Generally, external device 18 may be a paging terminal, computer, telephone, or other communication device coupled to cellular telephone network 12 using the public switch telephone network (PSTN), a global computer network such as the Internet, or other communication network. In a particular embodiment, a paging service provider operates external device 18 to transmit pages to and receive pages from messaging units 14. For example, a paging service may receive voice calls from a caller and transcribe the voice message into a paging message for delivery to the destination. External devices 18 may couple to additional communication facilities that allow persons or equipment to receive or transmit pages through external devices 18. These communication facilities may include a satellite paging network, land-line paging network, the PSTN, the Internet, or other communication network.

Cellular telephone network 12 comprises a collection of cellular telephone systems having mobile switching centers (MSCs) 20 coupled together using link 22 or interconnection facilities 24. Cellular telephone network 12 may incorporate analog signaling techniques, such as those used in the Advanced Mobile Phone Service (AMPS), Narrowband Analog Mobile Phone Service (N-AMPS), European Total Access Communication System (ETACS), and EIA/TIA 553 standards. Cellular telephone network 12 may also incorporate digital signaling techniques, such as code division multiple access (CDMA), time division multiple access (TDMA), or other appropriate digital technique. Cellular telephone network 12 may also support various digital standards, such as United States Digital Cellular (USDC), Global System for Mobile (GSM), IS-54, IS-95, and other variants. In a particular embodiment, the present invention exploits the communication infrastructure and geographical footprint of an analog cellular telephone network to provide enhanced messaging capabilities.

Interconnection facilities 24 include components of a Signaling System 7 (SS7) network; a cellular clearing house operated by EDS, GTE/TSI, or other provider; X.25 communication facilities; portions of the PSTN; or other communication link that allows location, validation, and call signaling information to be transferred between MSCs 20 of cellular telephone network 12. Specifically, interconnection facilities 24 support the network protocol standard IS-41, including autonomous registration, to provide interoperator roaming of messaging units 14. Also, interconnection facilities 24, link 22, and MSCs 20 support enhancements to and future improvements and/or replacements of the IS-41 standard that provide the messaging functions of communication system 10 described below.

Each MSC 20 services a number of cell sites 30 that provide a wireless link 32 to messaging unit 14. MSC 20 maintains a database 34 that stores information on messaging units 14 serviced by cellular telephone network 12. For example, database 34 can maintain class of service restrictions for a line range of mobile identification numbers (MINs) or other identifiers associated with messaging units 14. One class of service restriction for designated messaging units 14 specifies only a limited number of authorized numbers (e.g, an 800 number associated with NCC 16) that messaging unit 14 may dial. Furthermore, database 34 contains further instructions and feature sets that establish specific processing directives for messages received from and transferred to messaging unit 14. In a particular embodiment, database 34 maintains a list of MINs that support a particular MIN statusing and feature code processing technique that allows messaging in a communication system 10. Moreover, database 34 includes a home location register (HLR), visitor location register (VLR), Authentication Center (AUC), and other information to maintain billing, service provisioning, registration, and other information for roaming or home subscribers.

A particular technical advantage of the present invention is the use of a range of MINs associated with messaging units 14 that may reduce or eliminate the need to register messaging units 14 as they roam into different cellular telephone systems of cellular telephone network 12. In this manner, database 34 in MSCs 20 of cellular telephone network 12 can identify messaging units 14 and process their communications accordingly without relying on expensive and complex registration procedures that assign temporary identifiers to messaging units 14. A similar system that provides this type of nation-wide roaming capability through different cellular telephone systems of cellular telephone network 12 is described in detail with reference to U.S. Pat. No. 5,539,810 entitled "Data Messaging in a Communications Network," which is herein incorporated by reference for all purposes in this application.

Each MSC 20 in cellular telephone network 12 may include an optional adjunct 36 that provides separate processing capabilities to handle messages received from and communicated to messaging units 14. Depending on the particular implementation of communication system 10, adjunct 36 may be integral to the hardware and software of MSC 20, a separate processing platform housed within MSC 20, or a separate and independent component placed between MSC 20 and interconnection facilities 24 or link 22. As described in more detail below, adjunct 36 may process messages communicated through MSC 20 using the extended protocol message format supported by cellular telephone network 12, feature code requests, MIN statusing, or other messaging techniques.

NCC 16 is coupled to cellular telephone network 12 using interconnection facilities 24. NCC 16 is also coupled to external devices 18 using link 40 which may be provided by components of a public switch telephone network (PSTN), a global computer network such as the Internet, other dedicated or public circuit switched or packet switched networks, or other data communication facilities. NCC 16 includes a cellular telephone network interface 46 and an external network interface 48 that include hardware and software to communicate information in the proper protocols or formats supported by interconnection facilities 24 and link 40, respectively. U.S. Pat. No. 5,539,810 describes the architecture and functions of a telecommunications platform that may serve as NCC 16.

NCC 16 also includes a message database 42 and a registration database 44. Message database 42 stores messages for delivery to messaging units 14 and external devices 18. Messages stored in message database 42 may be assigned priority, given time stamps, arranged chronologically or by associated messaging unit 14 or external device 18, or formatted in any appropriate way to accomplish the messaging functions of communication system 10.

Registration database 44 stores location, registration, or addressing information received from messaging units 14 serviced by cellular telephone network 12. For example, registration database 44 may include HLR, VLR, and AUC databases to perform service provisioning, registration, authentication, billing and other functions. In a particular embodiment, registration database 44 maintains the HLR for messaging units 14 serviced by cellular telephone network 12.

Registration database 44 stores geographical coordinates such as global positioning system (GPS) position fixes, LORAN-C information, or other geographical information received from messaging units 14. Registration database 44 also stores cellular telephone system information on the current cellular telephone system, MSC 20, cell site 30, or other component of cellular telephone network 12 that currently provides communication services to messaging units 14. This information may include a system identification number (SID), a mobile serving carrier ID (MSCID), a switch ID (SWID), or any other identifier of the communications provider. Furthermore, this information may include an access number for the communication provider, such as a number for a roamer access port (RAP), rural service area (RSA) information, temporary local dialing number (TLDN), or information associated with autonomous registration under the IS-41 standard. Registration database 44 maintains and associates this information with messaging units 14 to allow NCC 16 to deliver messages to messaging units 14. For example, NCC 16 may identify messaging units 14 associated with trucks or other vehicles using a truck identification number (TIN).

Registration database 44 also stores location, addressing, or registration information for external devices 18 accessible using link 40. For example, registration database 44 maintains uniform resource locator (URL) addresses, Internet protocol (IP) addresses, or other addressing information for external devices 18 coupled to a global computer network such as the Internet. Registration database 44 also maintains phone numbers for external devices 18 coupled to the PSTN. Moreover, registration database 44 maintains network addresses, node addresses, and other addressing information for external devices 18 coupled to a local area network (LAN), a wide area network (WAN), or other public or private communication network.

In operation, communication system 10 communicates both internal messages between messaging units 14 and external messages between messaging units 14 and external devices 18. To send an internal message, messaging unit 14a generates a message for delivery to messaging unit 14b. Messaging unit 14a transmits the message to a serving cell site 30a over wireless link 32a using a variety of techniques. In one embodiment, messaging unit 14a communicates the message in an extended protocol message format for transmission in the reverse control channel supported by wireless link 32a. Alternatively, messaging unit 14a may use any of the variety of messaging techniques described in U.S. Pat. No. 5,539,810, including MIN statusing and feature code request messaging.

Cell site 30a serving messaging unit 14a receives the message over wireless link 32a and passes the message to its associated MSC 20a or adjunct 36a. MSC 20a or adjunct 36a then consult information in database 34a regarding the processing of the message and communicate the message to NCC 16 using interconnection facilities 24. NCC 16 may then store the message in message database 42 for later forwarding to messaging unit 14b. For example, NCC 16 may assign a delivery priority or hold the message until messaging unit 14b supplies location, addressing, or registration information that allows NCC 16 to forward the message.

To deliver the message from NCC 16 to messaging unit 14b, NCC 16 retrieves the message from message database 42 and consults registration database 44 to determine that MSC 20b currently provides communication services to messaging unit 14b. This may be indicated by a table stored in registration database 44 that relates messaging unit 14b to a SID, MSCID, SWID, RAP, TLDN, or other information regarding cellular telephone network 12 or MSC 20b. Using the retrieved information, NCC 16 generates an appropriate message for communication to MSC 20b using interconnection facilities 24.

MSC 20b or adjunct 36b receives the message and consults database 32b to determine the location, sector, address, or other information regarding messaging unit 14b. MSC 20b or adjunct 36b then generates a message for delivery over wireless link 32b using serving cell site 30b. In a particular embodiment, MSC 20b communicates the message in an extended protocol message format for transmission in a forward control channel of wireless link 32b to messaging unit 14b. Communication system 10 also contemplates the transmission of messages using data over traditional voice channels supported by components of cellular telephone network 12. This may be important since cellular telephone network 12 may not immediately adopt certain communications protocol to handle messaging in out-of-band channels. In one embodiment, components in communication system 10 may operate in a hybrid mode to support both in-band and out-of-band signalling depending on the capabilities of cellular telephone network 12 providing service to messaging unit 14.

NCC 16 may also communicate messages received or stored in message database 42 to external device 18. In this embodiment, NCC 16 consults registration database 44 to retrieve a paging identifier, a telephone number, URL or IP address, electronic mail address, or other addresses or identifiers of external device 18. NCC 16 generates an appropriate message using a protocol and communication pathway supported by link 40 to deliver the message to external device 18. In a similar manner, external device 18 generates a message for communication to NCC 16 using link 40. NCC may store a message in message database 42, and later send the message to the intended messaging unit 14 using information maintained in registration database 44.

During operation of communication system 10, messaging units 14 may travel to different MSCs 20 and different cellular telephone systems in cellular telephone network 12. Also, mobile or fixed messaging units 14 may be activated and deactivated depending on their intended operation and the immediacy of their messaging needs. As messaging units 14 enter new service areas or become activated in current service areas, messaging units 14 communicate information to NCC 16 to update registration database 44. For example, the network protocol standard IS-41 directs the serving cellular telephone system to send a registration message to the home cellular system so that the HLR in registration database 44 at NCC 16 may be updated. This may be done without updating the VLR of the serving cellular telephone system. Several other techniques for providing registration updates from messaging units 14 are described with reference to U.S. Pat. No. 5,539,810, including present messages initiated using a feature request code such as *19. One technical advantage of communication system 10 is a centralized registration of messaging units 14 that allows NCC 16 to direct messages to messaging units 14 through the appropriate components of cellular telephone network 12.

Figure 2:
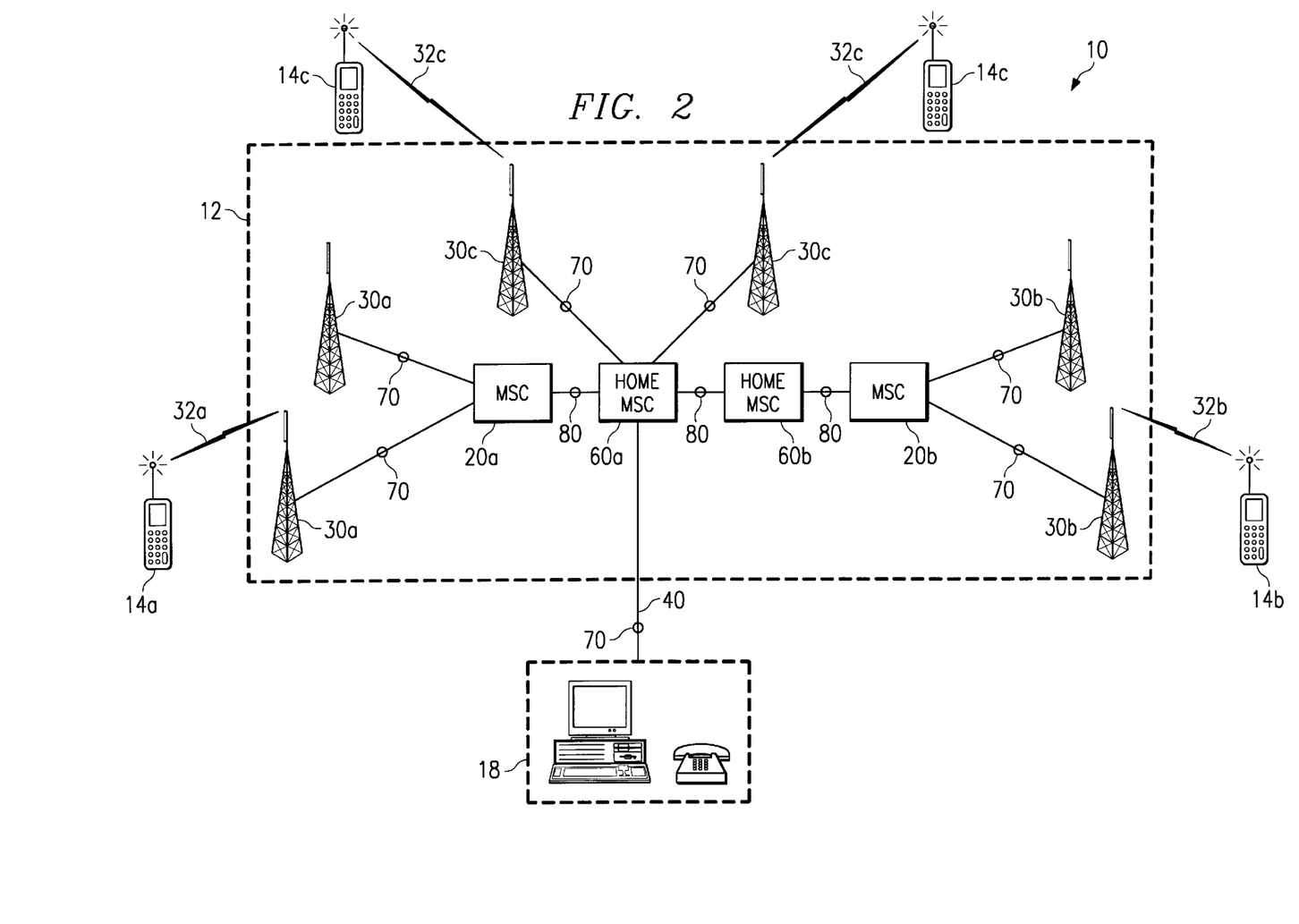
FIG. 2 illustrates another embodiment of a communication system that includes a cellular telephone network with access to external devices.

FIG. 2 illustrates another embodiment of communication system 10 that includes cellular telephone network 12 having MSCs 20 as well as home MSCs 60. In this embodiment, one or more home MSCs 60, for example home MSC 60a, may provide a link 40 to external devices 18. In this embodiment, MSC 20a serving messaging unit 14a is coupled to home MSC 60a, which in turn is coupled to home MSC 60b and MSC 20b serving messaging unit 14b. Home MSC 60a also includes associated cell sites 30c and associated messaging units 14c. MSCs 20 and home MSCs 60 maintain databases 34 as described above with reference to FIG. 1.

It should be understood that the distinction between MSC 20 and home MSC 60 principally relies on the relationship between MSC 20 or 60 and messaging unit 14. For example, MSC 20a and home MSC 60a are the serving and home MSCS, respectively, of messaging unit 14a. Similarly, MSC 20b and home MSC 60b are the serving MSC and home MSC, respectively, of messaging unit 14b. It should be understood that MSCs 20 and home MSCs 60 may be redesignated depending on their relation as a home or serving MSC to a particular messaging unit 14 or external device 18. Therefore, the designations of MSCs 20 and home MSCs 60 in FIG. 2 relate to an exemplary arrangement of messaging units 14, but may be redesignated without departing from the scope of the present invention.

An important technical advantage of the communication system 10 shown in FIG. 2, is the adaptation of a cellular telephone network architecture to provide both internal and external messaging capabilities. In this case, messaging units 14a and 14b represent roaming subscribers currently serviced by MSCs 20a and 20b, respectively, but having a home base or home MSCs 60a and 60b, respectively. Messages communicated between messaging units 14a and 14b pass between MSCs 20 and home MSCs 60 in cellular telephone network 12 using adapted and supportable message processing techniques in cellular telephone network 12.

The communication of messages in communication system 10 is accomplished using local messages 70 between messaging units 14 and MSCs 20 and remote messages 80 between the collection of MSCs 20 and home MSCs 60. Both local messages 70 and remote messages 80 are depicted in FIG. 2 by circles around the links that communicate these messages. By defining the format and characteristics of both local and remote messages, each MSC 20 and home MSC 60 can process messages in a similar manner irrespective of their station along the message path in cellular telephone network 12. This provides consistency in interface and messaging format definitions and reduces or eliminates modifications of the hardware and software of cellular telephone network 12.

In operation, messaging unit 14a generates local message 70 for delivery to messaging unit 14b, and communicates local message 70 to cell site 30a using wireless link 32a. MSC 20a receives local message 70 from cell site 30a, consults its database 34, and generates remote message 80 for delivery to home MSC 60a. In a similar manner, home MSC 60a generates another remote message 80 for delivery to home MSC 60b, and home MSC 60b generates another remote message 80 for delivery to MSC 20b. MSC 20b generates another local message 70, and communicates local message 70 to messaging unit 14b using cell site 30b and wireless link 32b.

In another embodiment, home MSC 60a may include one or more components of NCC 16 described above, including message database 42, registration database 44, cellular telephone network interface 46, and communication network interface 48. Home MSC 60a receives remote message 80 from MSC 20a and stores remote message 80 in message database 42. MSC 60a then consults registration database 44 to retrieve addressing information and generates local message 70 for delivery over link 40 to external device 18. In a similar manner, home MSC 60a may receive local messages 70 from external devices 18 using link 40 and redirect these messages to messaging units 14 serviced by cellular telephone network 12.

Communication system 10 also supports messaging between any combination of roaming messaging units 14a and 14b and local messaging units 14c. For example, the message generated at messaging unit 14a may be directed to messaging unit 14c directly serviced by home MSC 60a. The communication of this message comprises local message 70 between messaging unit 14a and MSC 20a, remote message 80 between MSC 20a and home MSC 60a, and local message 70 between home MSC 60a and messaging unit 14c. Similarly, messaging unit 14c may generate and communicate a message to messaging unit 14b. Communication system 10 delivers this message using local message 70 between messaging unit 14c and home MSC 60a, remote message 80 between home MSC 60a and home MSC 60b, remote message 80 between home MSC 60b and MSC 20b, and local message 70 between MSC 20b and messaging unit 14b. Finally, a message may be sent between messaging units 14c serviced by home MSC 60a using a pair of local messages 70. The present invention contemplates any number and combination of messages between local and roaming messaging units 14 in cellular telephone network 12.

Figure 3:
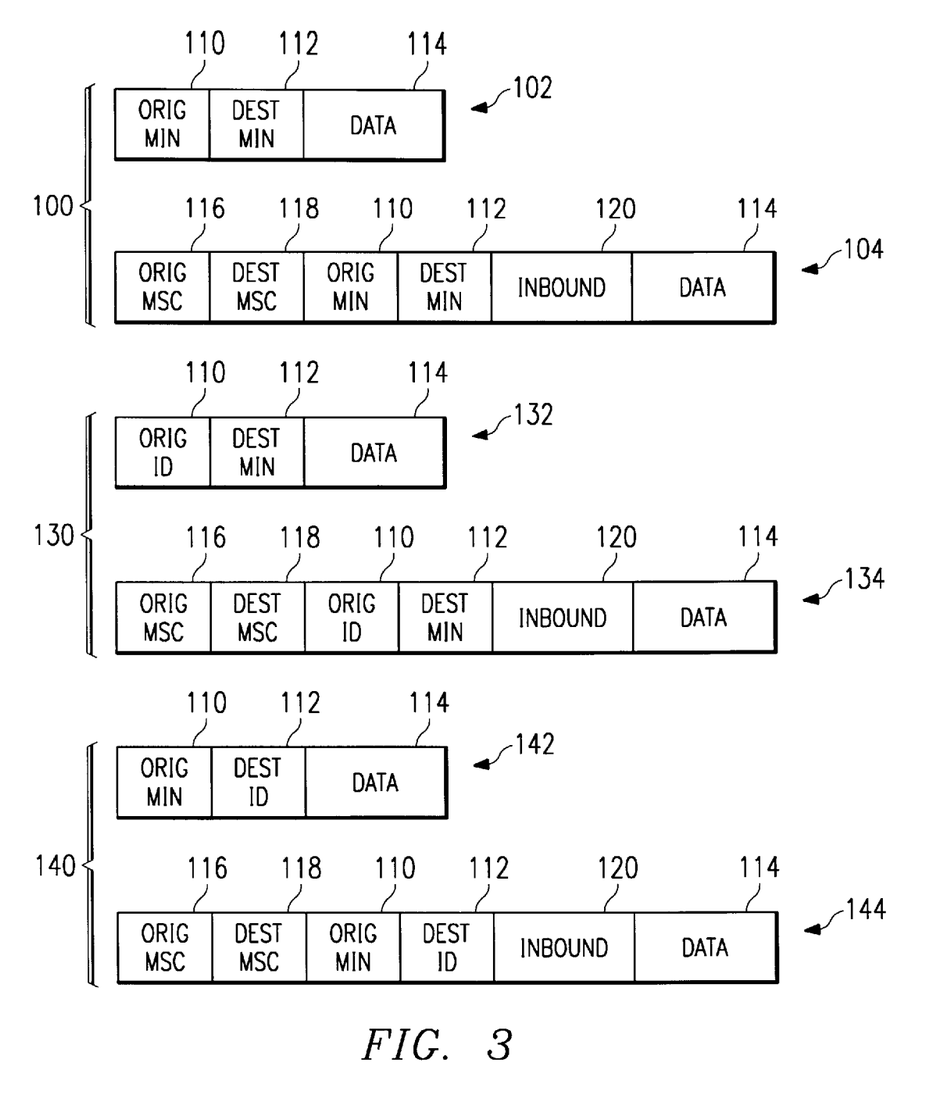
FIG. 3 illustrates exemplary message formats used in the communication system.

FIG. 3 illustrates exemplary message formats used in communication system 10. It should be understood that these formats may contain data and fields beyond those illustrated without departing from the scope of the present invention. For example, framing information, control channel information, EIA/TIA 553 information, IS-41 information, synchronization and error correction information, or other data and fields may be included in these message formats.

Internal message formats 100 convey messages among messaging units 14 serviced by cellular telephone network 12 and include a local message 102 and a remote message 104. Internal message formats 100 address messaging units 14 using a mobile identification number (MIN), electronic serial number (ESN), vehicle identification number (VIN), personal identification number (PIN), or any other suitable address or identifier of messaging units 14. Remote message 102 comprises an originating address 110, a destination address 112, and associated message data 114. In a particular embodiment, message data 114 comprises user data not associated with the operation of cellular telephone network 12. For example, message data 114 may include pages, electronic mail messages, facsimile data, compressed and/or digitized voice messages, geographical location coordinates of messaging units 14, sensor information collected by messaging units 14, or other information not associated with the operation of cellular telephone network 12. Communication system 10 uses local message 102 to communicate internal messages between messaging unit 14 and its serving MSC 20.

Remote message 104 includes originating address 110, destination address 112, and message data 114, together with an originating MSC address 116 and a destination MSC address 118. MSC addresses 116 and 118 may specify MSCs 20, home MSCs 60, or NCC 16. In addition, remote message 104 includes an inbound identifier 120 that indicates whether the message is inbound to home MSC 60 or NCC 16 associated with originating messaging unit 14.

Inbound external message formats 130 include a local message 132 and a remote message 134 used to deliver a message from external device 18 to messaging unit 14. Local message 132, like local message 102 described above, comprises originating address 110, destination address 112, and message data 114. In this embodiment, originating address 110 may comprise a URL or IP address, e-mail address, phone number, network or node address, or other identifier or address of external device 18. Communication system 10 communicates local message 132 on link 40, as well as between serving MSC 20 and destination messaging unit 14. Remote message 134, like remote message 104 described above, includes originating MSC address 116, destination MSC address 118, originating address 110, destination address 112, inbound indicator 120, and message data 114. Communication system 10 may communicate remote message 134 between any combination of MSCs 20, home MSCs 60, and NCC 16 to destination messaging unit 14.

Outbound external message formats 140 comprise local message 142 and remote message 144 used to delivery a message from messaging unit 14 to external device 18. These messages are similar to inbound external message formats 130, but include an address or identifier of external device 18 in a destination address 112.

Figure 4:
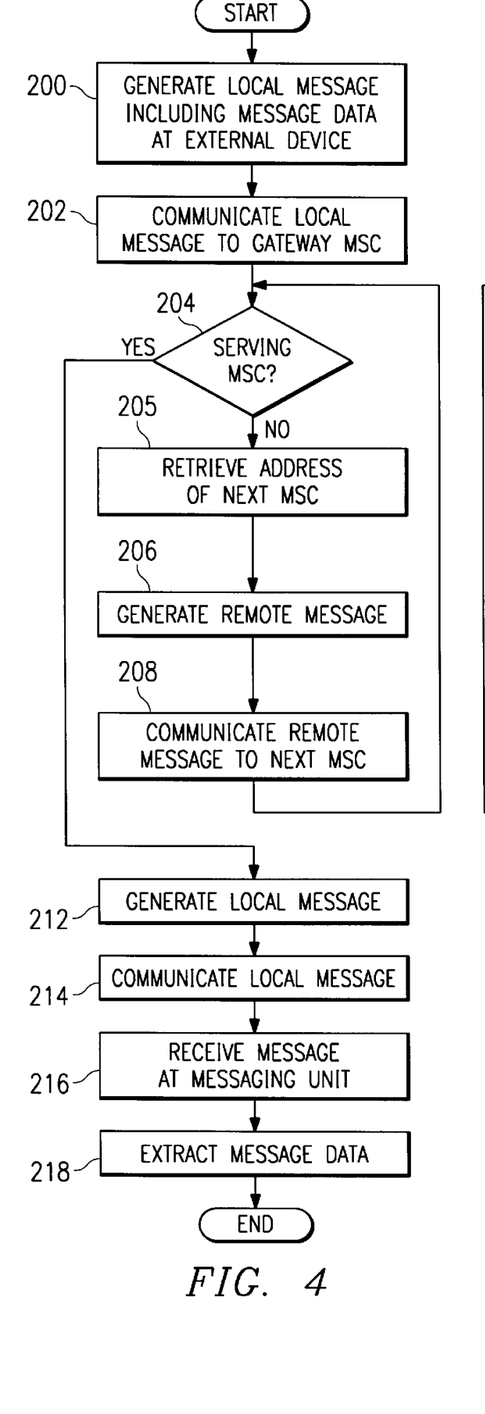
FIG. 4 is a flow chart of a method for communicating a message from an external device to a messaging unit.

FIG. 4 is a flow chart of a method for communicating a message from an originating external device 18 to a destination messaging unit 14. The method begins at step 200 where originating external device 18 generates a message including message data for delivery to destination messaging unit 14 in the format of local message 132. Originating external device 18 communicates local message 132 to a gateway MSC coupled to originating external device 18 at step 202. Gateway MSC includes home MSC 60, NCC 16, or other MSC providing link 40 to originating external device 18.

The gateway MSC consults its database 34 to determine if it currently services destination messaging unit 14 as identified by destination address 112 of local message 132 at step 204. If the gateway MSC does not service destination messaging unit 14 as determined at step 204, the gateway MSC retrieves an identifier for the next MSC (e.g., serving MSC 20, home MSC 60) of destination messaging unit 14 from its database 34 at step 205. The gateway MSC then generates remote message 134 having destination MSC address 118 set to the address of the next MSC at step 206, and communicates remote message 134 to the next MSC at step 208. If the next MSC is not the serving MSC of messaging unit 14 as determined again at step 204, then the method retrieves an address of the next MSC at step 205, generates an additional remote message 134 at step 206, and communicates the additional remote message 134 at step 208. In this manner, communication system 10 communicates any number of remote messages 134 to reach the serving MSC of destination messaging unit 14.

When remote message 134 reaches the serving MSC of destination messaging unit 14 as determined at step 204, the serving MSC generates local message 132 for delivery to destination messaging unit 14 at step 212. The serving MSC communicates local message 132 using broadcast or sectorized paging techniques at step 214. Destination messaging unit 14 receives local message 132 from cell site 30 associated with the serving MSC at step 216. For example, destination messaging unit 14 may receive local message 132 by monitoring extended protocol messages received from cell site 30 or by monitoring traffic in the overhead message stream or control channels of wireless link 32. Upon receiving local message 132, destination messaging unit 14 extracts message data 114 for evaluation or additional processing at step 218, and the method ends.

In some cases, destination messaging unit 14 may have traveled outside of the coverage area of cellular telephone network 12, powered down, or is otherwise unable to receive a message. Cell site 30, MSC 20, or home MSC 60 may detect the undelivered status of the message by an absence of acknowledgment from destination messaging unit 14. In such a case, communication system 10 attempts message delivery several times over a given interval, for example, five times over the next thirty minutes. If the message remains undelivered after repeated attempts, communication system 10 generates and communicates a return message to originating external device 18 or originating messaging unit 14 that indicates the original message could not be delivered.

Figure 5:
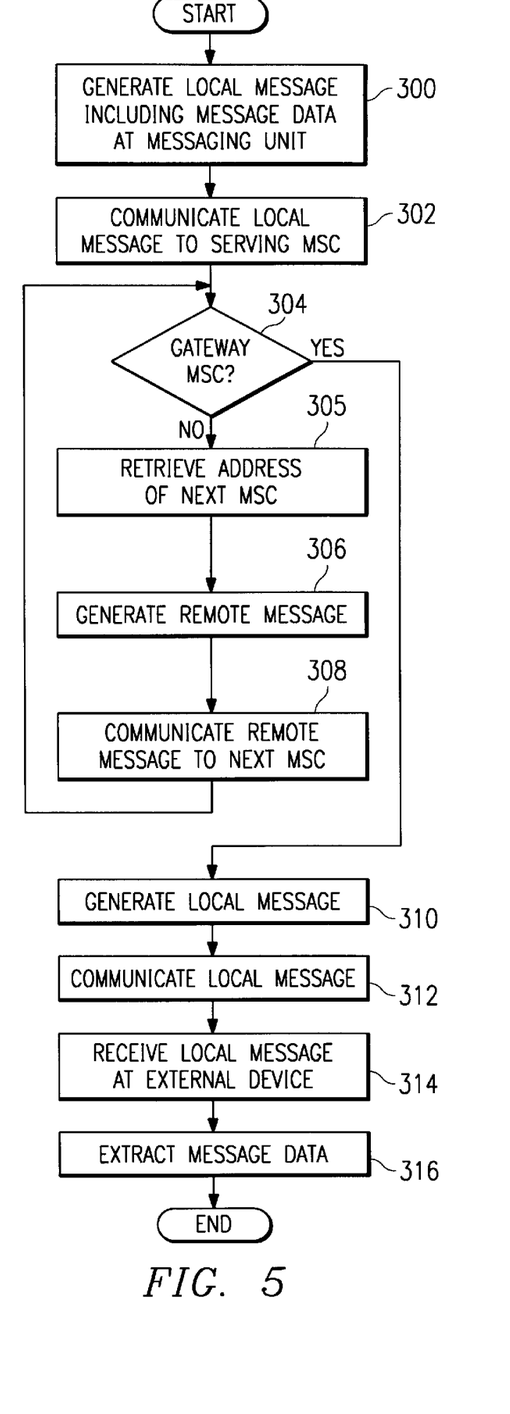
FIG. 5 is a flow chart of a method for communicating a message from a messaging unit to an external device.

FIG. 5 is a flow chart for communicating a message from an originating messaging unit 14 to a destination external device 18. The method begins at step 300 where originating messaging unit 14 generates a message including message data 114. Originating messaging unit 14 then communicates local message 142 to the serving MSC at step 302. This may be accomplished using a variety of messaging techniques, such as feature code request messaging, MIN statusing, extended protocol messaging, or other technique. If the serving MSC is not the gateway MSC coupled to destination external device 18 at step 304, then the serving MSC consults its database 34 to retrieve the address of the next MSC (e.g., MSC 20, home MSC 60, NCC 16) to generate remote message 144 at step 306. The serving MSC communicates remote message 144 to the next MSC along the communication path to external device 18 at step 308. This process of determining if the next MSC is the gateway MSC at step 304, and if not, generating and communicating remote message 144 at steps 306 and 308, is repeated until remote message 144 arrives at the gateway MSC coupled to destination external device 18.

If the receiving MSC is the gateway MSC at step 304, then the gateway MSC generates local message 142 at step 310. This may be accomplished by consulting registration database 44 to retrieve an identifier or address associated with destination external device 18. Local message 142 is then communicated over link 40 to destination external device 18 at step 312, and received at destination external device 18 at step 314. Destination external device 18 then extracts message data 114 at step 316 for evaluation or further processing, and the method ends.

Figure 6:
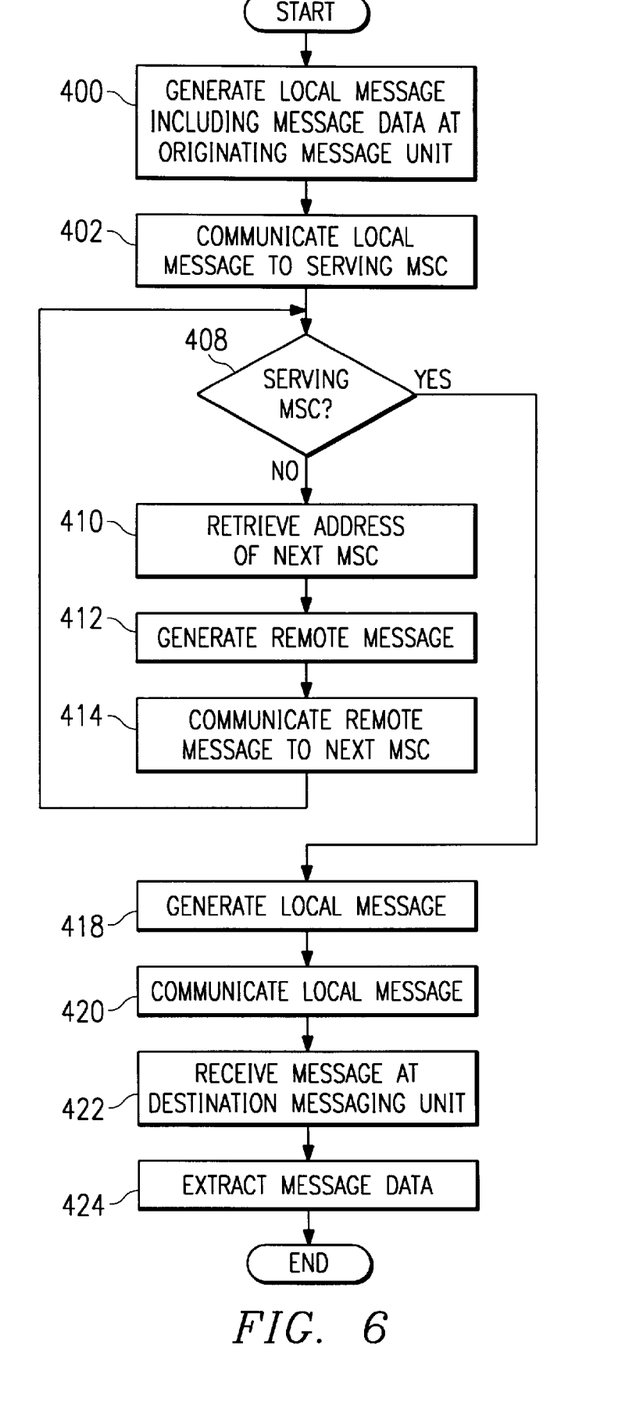
FIG. 6 is a flow chart of a method for communicating a message between messaging units.

FIG. 6 is a flow chart of a method for communicating a message between two messaging units 14 serviced by cellular telephone network 12. The method begins at step 400 where originating messaging unit 14 generates local message 102 for delivery to destination messaging unit 14. Originating messaging unit 14 communicates local message 102 to its serving MSC at step 402. The serving MSC consults database 34 to determine if it currently provides service to destination messaging unit 14 at step 408. If the serving MSC does not currently service destination messaging unit 14, then the serving MSC retrieves the address of the next MSC from its database 34 (e.g., home MSC 60 of originating messaging unit 14, home MSC 60 of destination messaging unit 14, serving MSC 20 of destination messaging unit 14) at step 410, and generates remote message 104 at step 412. The serving MSC communicates remote message 104 to the next MSC along the communication path between originating messaging unit 14 and destination messaging unit 14 at step 414. The receiving MSC again determines if it is the serving MSC of destination messaging unit 14 at step 408 by consulting its associated database 34.

The steps of retrieving the address of the next MSC at 410, generating remote message 104 at 412, and communicating remote message 104 to the next MSC at step 414 are repeated until the serving MSC of destination messaging unit 14 receives remote message 104, as determined at step 408.

The serving MSC of destination messaging unit 14 generates local message 102 at step 418, and communicates local message 102 using broadcast or sectorized paging techniques at step 420. Destination messaging unit 14 receives local message 102 at step 422 and extracts message data 114 for evaluation or further processing at step 424, and the method ends.

Figure 7:
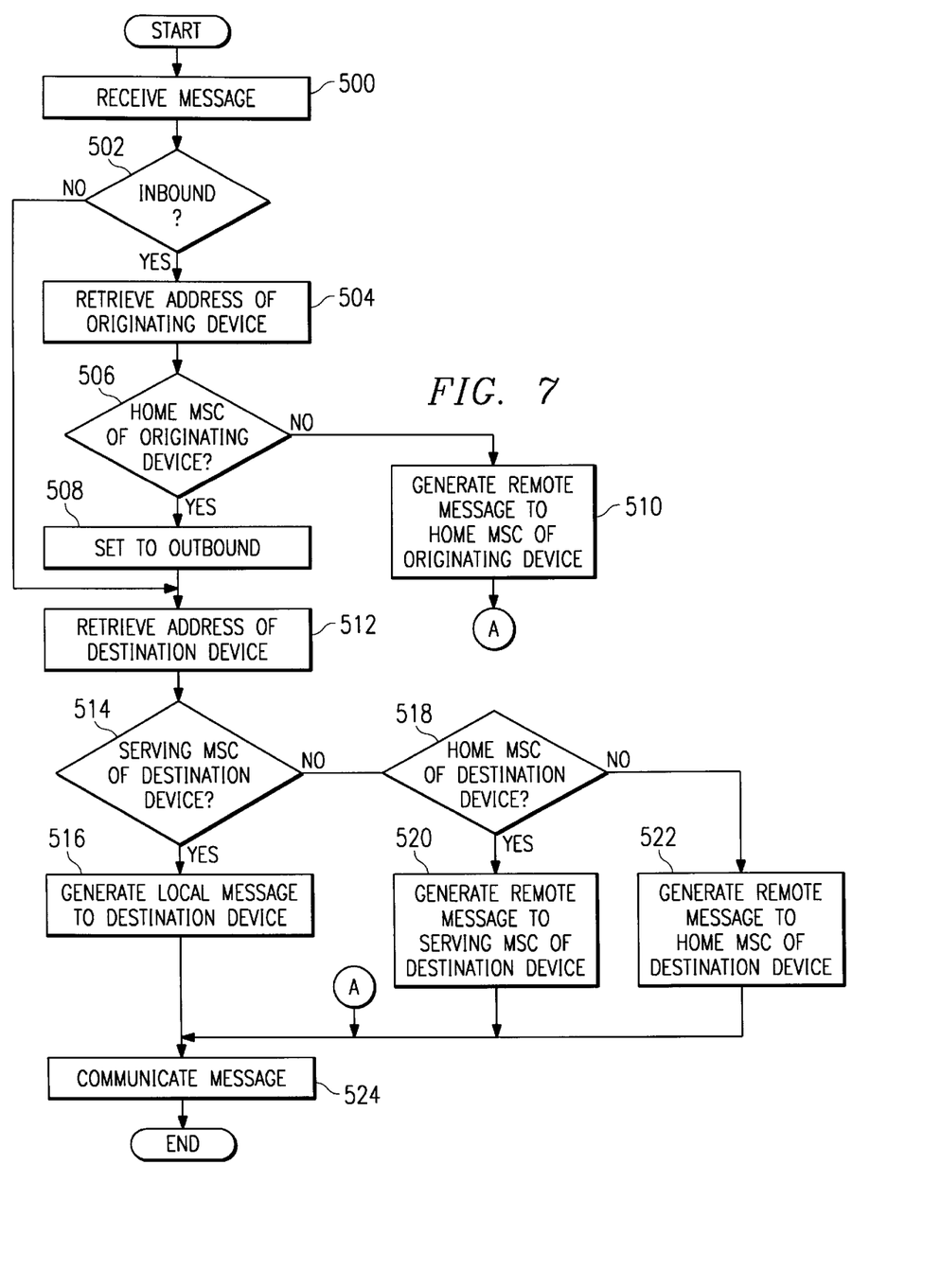
FIG. 7 is a flow chart of a method for processing a message received at a mobile switching center.

FIG. 7 is a flow chart of a method for processing a message received at MSCs 20 and home MSCs 60 in cellular telephone network 12. This method illustrates a common processing technique that may be shared among the many MSCs 20 and home MSCs 60 in cellular telephone network 12. A particular technical advantage of the present invention is the use of consistent messaging formats and processing techniques that allow communication of messages in cellular telephone network 12. For convenience this method will be described with reference to MSC 20, but its teachings are equally applicable to the processing of a message at home MSC 60 and NCC 16. Moreover, the method generally applies to messages communicated from an originating device (messaging unit 14 or external device 18) to a destination device (messaging unit 14 or external device 18) using cellular telephone network 12.

The method begins at step 500 where MSC 20 receives a message. MSC 20 then analyzes the message to determine if inbound identifier 120 indicates the message is inbound to home MSC 60 of originating device at step 502. If the message is inbound, MSC 20 retrieves the address of the originating device from the message at step 504. MSC 20 then consults its associated database 34 to determine if it is the home MSC of the originating device at step 506. If MSC 20 is the home MSC of the originating device at step 506, the method sets inbound identifier 120 to outbound at step 508. If MSC 20 is not the home MSC of the originating device at step 506, the method generates a remote message to the home MSC of the originating device at step 510.

If the message received at MSC 20 is not an inbound message as determined at step 502 or is set to an outbound message at step 508, MSC 20 retrieves the address of the destination device from the message at step 512. If MSC 20 is the serving MSC of the destination device as determined by a query to database 34 at step 514, then MSC 20 generates a local message to destination device at step 516. If MSC 20 is not the serving MSC of destination device but instead is the home MSC of destination device as determined by a query to database 34 at step 518, then MSC 20 generates a remote message to the serving MSC of destination device at step 520. If MSC 20 is neither the serving nor home MSC of destination device as determined at steps 514 and 518, then MSC 20 generates a remote message to the home MSC of destination device at step 522.

At this stage, MSC 20 has determined its station along the communication path in cellular telephone network 12 between the originating device and the destination device. Based on this determination, MSC 20 may consult its database 34 and retrieve an MSC address or device address to generate a local message to the destination device (step 516), a remote message to the serving MSC of the destination device (step 520), a remote message to the home MSC of the destination device (step 522), or a remote message to the home MSC of the originating device (step 510). After determining the appropriate message format and addressing, MSC 20 communicates the message at step 524, and the method ends.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating a message to a messaging unit using a cellular telephone network, comprising:
    a messaging unit;
    a serving mobile switching center providing service to the messaging unit, wherein the serving mobile switching center comprises a portion of the cellular telephone network;
    a network central controller coupled to the serving mobile switching center, the network central controller having a first database that identifies the serving mobile switching center providing service to the messaging unit;
    a device external to the cellular telephone network and coupled to the network central controller by a communication network, wherein the device generates a message for delivery to the messaging unit using the network central controller and the serving mobile switching center of the cellular telephone network; and,
    a second database of the network central controller to store messages for delivery to the messaging unit.

2. The system of claim 1, wherein the cellular telephone network comprises an analog cellular telephone network.

3. The system of claim 1, wherein the serving mobile switching center receives the message from the network central controller and transmits the message in an overhead message stream to the messaging unit.

4. The system of claim 1, wherein the serving mobile switching center receives the message from the network central controller and transmits the message in an overhead message stream of a plurality of selected cell sites to the messaging unit.

5. The system of claim 1, further comprising an adjunct processor at the serving mobile switching center to format the message as an extended protocol message for transmission in the forward control channel to the messaging unit.

6. The system of claim 1, wherein the network central controller comprises a home mobile switching center of the messaging unit.

7. The system of claim 1, wherein the communication network comprises a public switched telephone network.

8. The system of claim 1, wherein the communication network comprises a global computer network.

9. The system of claim 1, wherein the message comprises message data not associated with the operation of the cellular telephone network.

10. A method for communicating a message to a messaging unit using a cellular telephone network, comprising:
    generating a first message at a device external to the cellular telephone network;
    receiving the first message at a network central controller;
    generating a second message at the network central controller using the first message;
    receiving the second message at a serving mobile switching center;
    generating a third message at the serving mobile switching center using the second message; and
    receiving the third message at the messaging unit.

11. The method of claim 10, wherein the step of generating the second message comprises:
    extracting a first address identifying the messaging unit from the first message;
    retrieving a second address identifying the serving mobile switching center from a database that associates the messaging unit to the serving mobile switching center; and
    addressing the second message with the second address.

12. The method of claim 10, wherein the step of generating the third message comprises:
    extracting a first address identifying the messaging unit from the second message; and
    addressing the third message with the first address.

13. The method of claim 10, further comprising the step of transmitting the third message in an overhead message stream.

14. The method of claim 10, further comprising the step of transmitting the third message in an overhead message stream of a plurality of selected cell sites defining a paging sector that includes the messaging unit.

15. The method of claim 10, further comprising the step of transmitting the third message as an extended protocol message in a forward control channel.

16. The method of claim 10, wherein the device external to the cellular telephone network comprises a computer coupled to the network central controller using the public switched telephone network.

17. The method of claim 10, wherein the first message, the second message, and the third message comprise message data not associated with the operation of the cellular telephone network.

18. A system for communicating messages containing user data between messaging units using a cellular telephone network, comprising:
    a first messaging unit;
    a second messaging unit; and
    a plurality of mobile switching centers of the cellular telephone network, each mobile switching center having a first mode to generate a remote message for delivery to another mobile switching center and a second mode to generate a local message for delivery to the second messaging unit, the remote message and the local message containing user data for delivery from the first messaging unit to the second messaging unit and wherein the remote message comprises an inbound indicator that specifies the progress of the remote message communicated through the mobile switching centers.

19. The system of claim 18, wherein the cellular telephone network comprises an analog cellular telephone network.

20. The system of claim 18, wherein the local message comprises an extended protocol message for transmission in a forward control channel to the second messaging unit.

21. The system of claim 18, wherein the local message comprises an extended protocol message for transmission in a forward control channel of a plurality of selected cell sites defining a paging sector that includes the second messaging unit.

22. The system of claim 18, wherein the mobile switching centers comprise:
    a serving mobile switching center of the first messaging unit; and
    a serving mobile switching center of the second messaging unit.

23. The system of claim 18, wherein the mobile switching centers comprise:
    a serving mobile switching center of the first messaging unit;
    a home mobile switching center of the first messaging unit;

a home mobile switching center of the second messaging unit; and a serving mobile switching center of the second messaging unit.

24. The system of claim 18, wherein the user data is not associated with the operation of the cellular telephone network.

25. A method for communicating a message containing user data between messaging units using a cellular telephone network, comprising:

communicating a first local message containing user data from a first messaging unit;

communicating a remote message containing the user data through a plurality of mobile switching centers in the cellular telephone network;

communicating a second local message containing the user data to a second messaging unit; and, wherein the remote message comprises an inbound indicator that specifies the progress of the remote message communicated through the mobile switching centers.

26. The method of claim 25, wherein the cellular telephone network comprises an analog cellular telephone network.

27. The method of claim 25, wherein the second local message comprises an extended protocol message for transmission in a forward control channel to the second messaging unit.

28. The method of claim 25, wherein the second local message comprises an extended protocol message for transmission in a forward control channel of a plurality of selected cell sites defining a paging sector that includes the second messaging unit.

29. The method of claim 25, wherein the step of communicating a remote message comprises communicating a remote message from a serving switching center of the first messaging unit to a serving switching center of the second messaging unit.

30. The method of claim 25, wherein the step of communicating a remote message comprises:

communicating a first remote message from a serving mobile switching center of the first messaging unit to a home mobile switching center of the first messaging unit;

communicating a second remote message from the home mobile switching center of the first messaging unit to a home mobile switching center of the second messaging unit; and communicating a third remote message from the home mobile switching center of the second messaging unit to a serving mobile switching center of the second messaging unit.

31. The method of claim 25, wherein the user data is not associated with the operation of the cellular telephone network.

32. A method for processing a message received at a mobile switching center of a cellular telephone network, comprising:

receiving a message at a mobile switching center, the message having an originating address, destination address, and message data;

generating a remote message that addresses another mobile switching center if the mobile switching center does not serve the destination address; and generating a local message that addresses the destination address if the mobile switching center serves the destination address.

33. The method of claim 32, wherein the step of generating a local message comprises generating an extended protocol message for transmission in a forward control channel to a messaging unit identified by the destination address.

34. The method of claim 32, wherein the step of generating a local message comprises:

generating an extended protocol message containing the destination address and the user data;

selecting a plurality of cell sites associated with a sector containing a messaging unit identified by the destination address;

transmitting the extended protocol message in a forward control channel of the selected cell sites.

35. The method of claim 32, wherein the step of generating a remote message further comprises generating a remote message that addresses a serving mobile switching center of the destination address.

36. The method of claim 32, wherein the step of generating a remote message further comprises:

generating a first remote message that addresses a home mobile switching center of the originating address if the mobile switching center is a serving mobile switching center of the originating address; and generating a second remote message that addresses a serving mobile switching center of the destination address if the mobile switching center is a home mobile switching center of the destination address.

37. The method of claim 32, wherein the step of generating a remote message further comprises:

generating a first remote message that addresses a home mobile switching center of the originating address if the mobile switching center is a serving mobile switching center of the originating address;

generating a second remote message that addresses a home mobile switching center of the destination address if the mobile switching center is a home mobile switching center of the originating address; and generating a third remote message that addresses a serving mobile switching center of the destination address if the mobile switching center is a home mobile switching center of the destination address.

38. The method of claim 32, wherein the mobile switching center comprises a portion of an analog cellular telephone network.

39. The method of claim 32, wherein the message further comprises an inbound indicator that specifies whether the mobile switching center is associated with the originating address.

40. The method of claim 32, wherein the user data is not associated with the operation of the cellular telephone network.

41. A system for communicating a message to a messaging unit using a cellular telephone network, comprising:

a messaging unit;

a serving mobile switching center providing service to the messaging unit, wherein the serving mobile switching center comprises a portion of the cellular telephone network;

a network central controller coupled to the serving mobile switching center, the network central controller having a first database that identifies the serving mobile switching center providing service to the messaging unit; and, a device external to the cellular telephone network and coupled to the network central controller by a communication network, wherein the device generates a message for delivery to the messaging unit using the network central controller and the serving mobile switching center of the cellular telephone network and wherein the communication network comprises a global computer network.

42. The system of claim 41, wherein the cellular telephone network comprises an analog cellular telephone network.

43. The system of claim 41, wherein the serving mobile switching center receives the message from the network central controller and transmits the message in an overhead message stream to the messaging unit.

44. The system of claim 41, wherein the serving mobile switching center receives the message from the network central controller and transmits the message in an overhead message stream of a plurality of selected cell sites to the messaging unit.

45. The system of claim 41, further comprising an adjunct processor at the serving mobile switching center to format the message as an extended protocol message for transmission in the forward control channel to the messaging unit.

46. The system of claim 41, further comprising a second database of the network central controller to store messages for delivery to the messaging unit.

47. The system of claim 41, wherein the network central controller comprises a home mobile switching center of the messaging unit.

48. The system of claim 41, wherein the communication network comprises a public switched telephone network.

49. The system of claim 41, wherein the message comprises message data not associated with the operation of the cellular telephone network.

50. A system for communicating messages containing user data between messaging units using a cellular telephone network, comprising:
　a first messaging unit;
　a second messaging unit; and
　a plurality of mobile switching centers of the cellular telephone network, each mobile switching center having a first mode to generate a remote message for delivery to another mobile switching center and a second mode to generate a local message for delivery to the second messaging unit, the remote message and the local message containing user data for delivery from the first messaging unit to the second messaging unit and wherein the mobile switching centers comprise:
　　a serving mobile switching center of the first messaging unit; and
　　a serving mobile switching center of the second messaging unit.

51. The system of claim 50, wherein the cellular telephone network comprises an analog cellular telephone network.

52. The system of claim 50, wherein the remote message comprises an inbound indicator that specifies the progress of the remote message communicated through the mobile switching centers.

53. The system of claim 50, wherein the local message comprises an extended protocol message for transmission in a forward control channel to the second messaging unit.

54. The system of claim 50, wherein the local message comprises an extended protocol message for transmission in a forward control channel of a plurality of selected cell sites defining a paging sector that includes the second messaging unit.

55. The system of claim 50, wherein the user data is not associated with the operation of the cellular telephone network.

56. The system of claim 50, wherein the mobile switching centers further comprising:
　a home mobile switching center of the first messaging unit; and
　a home mobile switching center of the second messaging unit.

57. A method for communicating a message containing user data between messaging units using a cellular telephone network, comprising:
　communicating a first local message containing user data from a first messaging unit;
　communicating a remote message containing the user data through a plurality of mobile switching centers in the cellular telephone network;
　communicating a second local message containing the user data to a second messaging unit; and,
　wherein the step of communicating a remote message comprises communicating a remote message from a serving switching center of the first messaging unit to a serving switching center of the second messaging unit.

58. The method of claim 57, wherein the cellular telephone network comprises an analog cellular telephone network.

59. The method of claim 57, wherein the remote message comprises an inbound indicator that specifies the progress of the remote message communicated through the mobile switching centers.

60. The method of claim 57, wherein the second local message comprises an extended protocol message for transmission in a forward control channel to the second messaging unit.

61. The method of claim 57, wherein the step of communicating a remote message further comprises:
　communicating a second remote message from the home mobile switching center of the first messaging unit to a home mobile switching center of the second messaging unit; and
　communicating a third remote message from the home mobile switching center of the second messaging unit to a serving mobile switching center of the second messaging unit.

62. The method of claim 57, wherein the user data is not associated with the operation of the cellular telephone network.

63. A system for communicating messages containing user data between messaging units using a cellular telephone network, comprising:
　a first messaging unit;
　a second messaging unit; and
　a plurality of mobile switching centers of the cellular telephone network, each mobile switching center having a first mode to generate a remote message for delivery to another mobile switching center and a second mode to generate a local message for delivery to the second messaging unit, the remote message and the local message containing user data for delivery from the first messaging unit to the second messaging unit and wherein the mobile switching centers comprise:
　　a serving mobile switching center of the first messaging unit;
　　a home mobile switching center of the first messaging unit;
　　a home mobile switching center enter of the second messaging unit.

64. A method for communicating a message containing user data between messaging units using a cellular telephone network, comprising:

communicating a first local message containing user data from a first messaging unit;

communicating a remote message containing the user data through a plurality of mobile switching centers in the cellular telephone network;

communicating a second local message containing the user data to a second messaging unit, wherein the step of communicating a remote message comprises:

communicating a first remote message from a serving mobile switching center of the first messaging unit to a home mobile switching center of the first messaging unit;

communicating a second remote message from the home mobile switching center of the first messaging unit to a home mobile switching center of the second messaging unit; and    communicating a third remote message from the home mobile switching center of the second messaging unit to a serving mobile switching center of the second messaging unit.

\* \* \* \* \*